United States Patent
Liu et al.

(10) Patent No.: US 12,422,609 B1
(45) Date of Patent: Sep. 23, 2025

(54) PLANAR-WAVEGUIDE-BASED MULTI-CHANNEL CROSSTALK-FREE METASURFACE HOLOGRAPHIC DEVICE

(71) Applicants: Huazhong University of Science and Technology, Wuhan (CN); The Regents of the University of Michigan, Ann Arbor, MI (US)

(72) Inventors: Zeyang Liu, Wuhan (CN); Cheng Zhang, Wuhan (CN); Lingjie Jay Guo, Ann Arbor, MI (US); Hao Gao, Wuhan (CN)

(73) Assignees: Huazhong University of Science and Technology, Wuhan (CN); The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 18/673,466

(22) Filed: May 24, 2024

(51) Int. Cl.
G02B 6/35 (2006.01)
F21V 8/00 (2006.01)
G02B 6/293 (2006.01)
G02B 6/38 (2006.01)
G03H 1/00 (2006.01)

(52) U.S. Cl.
CPC ........ *G02B 6/0016* (2013.01); *G02B 6/29311* (2013.01); *G02B 6/3522* (2013.01); *G02B 6/3885* (2013.01); *G03H 2001/0088* (2013.01); *G03H 2223/16* (2013.01)

(58) Field of Classification Search
USPC ......................................... 348/40
See application file for complete search history.

(56) References Cited

U.S. PATENT DOCUMENTS

| | | | |
|---|---|---|---|
| 2020/0081176 A1* | 3/2020 | Bartlett | G02B 6/0016 |
| 2020/0116996 A1* | 4/2020 | Lee | G02B 27/0081 |
| 2020/0166756 A1* | 5/2020 | DeLapp | G02B 6/0016 |
| 2020/0166889 A1* | 5/2020 | Kostromine | B32B 27/32 |

* cited by examiner

*Primary Examiner* — Nigar Chowdhury
(74) *Attorney, Agent, or Firm* — IPro, PLLC

(57) ABSTRACT

Disclosed is a type planar-waveguide-based multi-channel crosstalk-free metasurface holographic devices, including a glass planar waveguide and a metasurface above the glass planar waveguide; light propagates inside the planar waveguide in the form of total internal reflections and illuminates the metasurface; the metasurface is capable of selectively projecting multiple crosstalk-free and independent holographic images according to different combinations of circular polarization state and azimuth angle of the total internal reflection incident light inside the waveguide. The device utilizes two properties of incident light, namely the state of polarization and the angle of incidence, and can selectively project multiple independent crosstalk-free holographic images according to the state of polarization and the propagation azimuthal angle of the total internal reflection light in the waveguide. In addition, the device has broadband operational property, such that the projected target images can have different colors.

9 Claims, 8 Drawing Sheets

PLANAR-WAVEGUIDE-BASED MULTI-CHANNEL CROSSTALK-FREE METASURFACE HOLOGRAPHIC DEVICE

TECHNICAL FIELD

The present disclosure relates to the technical field of micro-nano optics and holographic display, and particularly relates to a planar-waveguide-based multi-channel crosstalk-free metasurface holographic device.

BACKGROUND

Holography is a technique that reconstructs three-dimensional or two-dimensional images based on optical diffraction and interference. Current implementations of the holography primarily rely on passive devices such as photosensitive materials (such as silver halide, and photopolymers), and diffractive optical elements (DOEs), or rely on active devices such as spatial light modulators (SLMs) and digital micro-mirror devices (DMDs). Restricted by their constituent materials, structural sizes, and modulation mechanisms, the aforementioned holographic devices suffer from serious constraints such as low imaging resolution, small imaging field of view, low operational efficiency, twin-image issue, and stray light caused by high-order diffraction.

Metasurfaces are a new type of planar optical components composed of sub-wavelength artificial meta-atoms, and have been undergoing rapid development in recent years. Metasurface features compact structure size and flexible light field modulation capability, enabling light field modulation functions such as beam focusing, polarization conversion, and structured beam generation. In recent years, with the rise and quick development of research on metasurfaces, metasurfaces have been widely used in holographic encoding and imaging. Thanks to the sub-wavelength meta-atom pitch and flexible light field modulation capability, holographic devices based on metasurfaces exhibit many advantages, such as higher imaging resolution, wider field of view, broader operational bandwidth, and higher operational efficiency.

However, metasurfaces in the visible light spectrum are mostly passive devices, which are incapable of displaying arbitrary images in real time, and can only display fixed patterns. Therefore, how to increase the information encoding capacity of metasurface holographic devices to provide multiple independent display channels has become a development direction in the field of metasurface holography. Current multi-channel metasurface holographic devices usually rely on meta-atoms sensitive to certain properties of incident light, such as state of polarization, angle of incidence, illumination wavelength, and orbital angular momentum, such that independent light field modulations can be imparted on the incident light with different property states to achieve the display and switch of multiple images. However, these approaches could only provide a limited number of channels (≤4 in most cases), and with an increase in the number of channels, obvious crosstalk between display channels is likely to occur, affecting the quality of projected images. Therefore, how to increase the number of display channels of the metasurface holographic devices while simultaneously maintaining minimal crosstalk between different channels has become an urgent issue to be solved in the field of metasurface holography.

SUMMARY

An objective of the present disclosure is to provide a planar-waveguide-based multi-channel crosstalk-free metasurface holographic device, so as to solve the problems that the existing metasurface holographic devices can only display a small number of channels, and suffer from crosstalk between different channels. The device utilizes two properties of incident light, namely the state of polarization and the angle of incidence, and can selectively project multiple independent crosstalk-free holographic images according to the state of polarization and the propagation azimuthal angle of the total internal reflection incident light in the waveguide. In addition, the device has broadband operational property, such that the projected target images can have different colors. The device has the advantages of a greater number of independent display channels, and free from crosstalk between different display channels.

The present disclosure is implemented through the following technical solutions: the present disclosure provides a type of planar-waveguide-based multi-channel crosstalk-free metasurface holographic devices, including a glass planar waveguide and a metasurface above the glass planar waveguide; light propagates inside the planar waveguide in the form of total internal reflections and illuminates the metasurface; the metasurface is capable of selectively projecting multiple crosstalk-free and independent holographic images according to different combinations of circular polarization state and azimuth angle of the total internal reflection incident light inside the waveguide; with total internal reflection light illumination, the metasurface-modulated light field of the holographic device is imparted an additional in-plane phase gradient to translate encoded target images between the propagation-wave region and the evanescent-wave region of k-space (spatial frequency space), therefore each target image can be selectively displayed free from crosstalk.

Further, the device can also realize the switch of all target images by only changing the azimuthal angle of the total internal reflection incident light in the waveguide.

Further, by adjusting the images encoded in different channels, a multi-channel polarization-independent holographic device only multiplexed by the incident azimuthal angle can also be implemented.

Further, by adjusting the images encoded in different channels, a multi-channel full-color holographic device only multiplexed by the state of polarization also can be implemented.

Further, in the design of the device, the k-space range of the metasurface-modulated light field can be enlarged by reducing the pitch P of meta-atoms.

Further, for normal incidence, multiple target images are encoded in the evanescent-wave region of the k-space of the metasurface-modulated light field, and according to the basic properties of Fourier transform, the encoded images will be translated in the k-space when the device is illuminated by a total internal reflection incident light; different target images can be selectively translated to the center of k-space according to the polarization state and the azimuthal angle of the total internal reflection incident light, such that the images can be projected along the normal direction of the device; by adjusting the size and positions of the multiple target images encoded in the k-space, it is ensured that only the selected target image can be translated to the center of the k-space each time when the device is illuminated by a total internal reflection incident light having different azimuthal angles and circular polarization states, while the other images remain in the evanescent-wave region, such that crosstalk between different display channels can be avoided, and a multi-channel crosstalk-free holographic display device is realized.

Further, the multi-channel metasurface holographic device works in Fraunhofer diffraction region, where the imaging distance is much greater than the size of the holographic device, satisfying the condition of $\max(k_0((x^2+y^2)/2z))<<\pi$, where $k_0$ denotes the free-space wave vector of the incident light, x and y are in-plane coordinates of the holographic device in two perpendicular directions, and z denotes the distance between the image plane and the holographic device; for the multi-channel metasurface holographic device working in the Fraunhofer diffraction region, a relationship between the light field $U_h$ modulated by the metasurface holographic device and the light field $U_i$ on the image plane can be expressed as:

$$U_i(f_x, f_y) = F(U_h(x, y))$$

where the light field $U_i$ on the image plane is the Fourier transform of the metasurface-modulated light field $U_h$, $f_x = k_x/2\pi$, and $f_y = k_y/2\pi$ are the spatial frequency components of the light field modulated by the metasurface holographic device and also denotes coordinates of the image plane; $k_x$ and $k_y$ denote the components of the free-space wave vector $k_0$ along the two perpendicular directions of x and y axes; as can be seen, the image projected by the holographic device is determined by the spatial frequency distribution of the metasurface-modulated light field $U_h$; the light intensity of the image projected by the metasurface holographic device is consistent to the square of the k-space spatial frequency distribution pattern of the metasurface, that is $I_i = |U_i(f_x, f_y)|^2 = |F(U_h(x, y))|^2$.

Since the metasurface holographic device applies discontinuous light field modulation through a discrete meta-atom array, the metasurface-modulated light field $U_h$, which has undergone a discrete Fourier transform (DFT), has a continuous and periodic spatial frequency distribution; regarding the metasurface-modulated light field $U_h$ as a two-dimensional discrete sequence, where the meta-atom pitch P denotes the sampling interval, the period of the spatial frequency distribution $U_h$ will be 1/P according to the properties of the discrete Fourier transform, and the central period ranges from $-\frac{1}{2}P$ to $\frac{1}{2}P$; considering a normalized spatial frequency coordinate system with two perpendicular coordinate axes of $k_x/k_0$ and $k_y/k_0$, the central-period spatial frequency region ranges from $-\lambda_0/2P$ to $\lambda_0/2P$, where $\lambda_0$ is the wavelength of the incident light in the vacuum; when P is less than half of the working wavelength $\lambda_0 (P<\lambda_0/2)$, the maximum values of the two perpendicular axes $k_x/k_0$ and $k_y/k_0$ exceed 1, and the central period now contains two parts: the propagation-wave region where the encoded images can propagate in free space; the evanescent-wave region where the encoded images are in the form of evanescent wave and thus cannot propagate in free space; the boundary of the two regions can be expressed as $(k_x/k_0)^2 + (k_y/k_0)^2 = 1$.

Further, for oblique incidence, the incident light imparts an additional in-plane phase gradient $p_g = n \sin(\alpha) k_0$ on the metasurface-modulated light field $U_h$. The in-plane phase gradient $p_g$ is determined by the incident angle $\alpha$ and the surrounding refractive index n.

According to the properties of the Fourier transform, $$U_i\left(\frac{1}{\lambda_0}\left(\frac{k_x}{k_0} - \frac{p_g}{k_0}\cos(\theta_x)\right), \frac{1}{\lambda_0}\left(\frac{k_y}{k_0} - \frac{p_g}{k_0}\cos(\theta_y)\right)\right) = F(U_h(x, y)\exp(ip_g(x\cos(\theta_x) + y\cos(\theta_y))))$$

the spatial frequency distribution pattern (encoded target images) will translate in the k-space when the metasurface-modulated light field $U_h$ is imparted an additional in-plane phase gradient $p_g$. In the coordinate system of normalized k-space with axes of $k_x/k_0$ and $k_y/k_0$, the translation distance $d_t = p_g/k_0$, and the components of the translation distance $d_t$ along the directions of $k_x/k_0$ and $k_y/k_0$ are $p_g \cos(\theta_x)/k_0$ and $p_g \cos(\theta_y)/k_0$, respectively; $\theta_x$ and $\theta_y$ denote the angles between the direction of the in-plane phase gradient and the two main axes x and y of the coordinate system on the holographic device's plane; when the device is applied a proper phase gradient that results in a translation distance $d_t > 1$, the target image in the evanescent-wave region can be translated to the propagation-wave region for free-space holographic projection.

The present disclosure has the following beneficial effects: the present disclosure provides a planar-waveguide-based multi-channel crosstalk-free metasurface holographic device. The device utilizes two properties of incident light, namely the state of polarization and the angle of incidence, and can selectively project multiple independent crosstalk-free holographic images according to the state of polarization and the propagation azimuthal angle of the total internal reflection light in the waveguide. In addition, the device has broadband operational property, such that the projected target images can have different colors. The device has the advantages of a greater number of independent display channels, and free from crosstalk between different display channels.

DETAILED DESCRIPTIONS OF THE EMBODIMENTS

The technical solutions of embodiments of the present disclosure will be described below clearly and comprehensively in conjunction with accompanying drawings of the embodiments of the present disclosure. Apparently, the described embodiments are merely some rather than all of the embodiments of the present disclosure. All the other embodiments obtained by those of ordinary skill in the art based on the embodiments in the present disclosure without creative efforts shall fall within the protection scope of the present disclosure.

The present disclosure provides a planar-waveguide-based multi-channel crosstalk-free metasurface holographic device, including a glass planar waveguide and a metasurface above the glass planar waveguide; light propagates inside the planar waveguide in the form of total internal reflections and illuminates the metasurface; the metasurface is capable of selectively projecting multiple crosstalk-free and independent holographic images according to different combinations of circular polarization state and azimuth angle of the total internal reflection incident light inside the waveguide; with total internal reflection light illumination, the metasurface-modulated light field of the holographic device is imparted an additional in-plane phase gradient to translate encoded target images between the propagation-wave region and the evanescent-wave region of k-space (spatial frequency space), therefore each target image can be selectively displayed free from crosstalk.

The device can also realize the switch of all target images by only changing the azimuthal angle of the total internal reflection incident light in the waveguide.

By adjusting the images encoded in different channels, a multi-channel polarization-independent holographic device only multiplexed by the incident azimuthal angle can also be implemented.

By adjusting the images encoded in different channels, a multi-channel full-color holographic device only multiplexed by the state of polarization can also be implemented.

Figure 1:
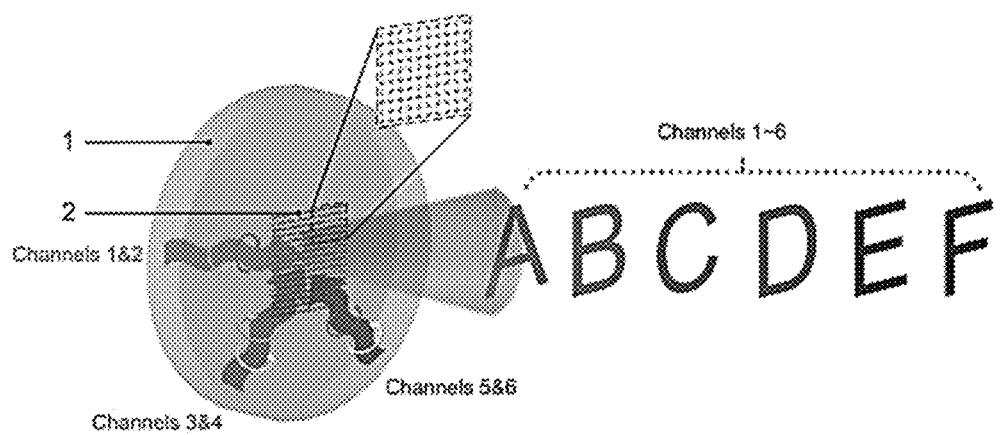
FIG. 1 shows the schematic diagram of a planar-waveguide-based six-channel metasurface holographic device in Embodiment 1 according to the present disclosure. In the figure, 1. refers to the glass planar waveguide; 2. refers to the metasurface.

The present disclosure provides a multi-channel metasurface holographic device capable of projecting multiple crosstalk-free holographic images according to the two properties (state of polarization and azimuthal angle) of the total internal reflection incident light inside the waveguide. Taking six-channel holographic display as an example, the schematic diagram of the device is shown in FIG. 1. When the total internal reflection incident light has different azimuthal angles and polarization states, the device can project different holographic images without crosstalk between different display channels.

The working principle of the device is to apply a phase gradient on the metasurface-modulated light field of the holographic device by illuminating the metasurface through the total internal reflection light, such that the encoded target holographic images can be switched between the propagation-wave region and the evanescent-wave region of k-space, and therefore each target holographic image can be selectively displayed. In the design of the device, the range of k-space of the metasurface-modulated light field can be enlarged by reducing the meta-atom pitch P. When P is less than half of the free-space working wavelength ($P<\lambda_0/2$), the central period of k-space now contains two parts: the propagation-wave region and the evanescent-wave region; for normal incidence, multiple target images are encoded in the evanescent-wave region of the k-space of the metasurface-modulated light field, and according to the basic properties of Fourier transform, the encoded images will be translated in the k-space when the device is illuminated by a total internal reflection incident light; different target images can be selectively translated to the center of k-space according to the polarization state and the azimuthal angle of the total internal reflection incident light, such that the images can be projected along the normal direction of the device; by adjusting the size and positions of the multiple target images encoded in the k-space, it is ensured that only the selected target image can be translated to the center of the k-space each time when the device is illuminated by a total internal reflection incident light having different azimuthal angles and circular polarization states, while the other images remain in the evanescent-wave region, such that crosstalk between different display channels can be avoided, and a multi-channel crosstalk-free holographic display device is realized.

The multi-channel metasurface holographic device works in Fraunhofer diffraction region, where the imaging distance is much greater than the size of the holographic device, satisfying the condition of $\max(k_0((x^2+y^2)/2z))<<\pi$, where $k_0$ denotes the free-space wave vector of the incident light, x and y are in-plane coordinates of the holographic device in two perpendicular directions, and z denotes the distance between the image plane and the holographic device; for the multi-channel metasurface holographic device working in the Fraunhofer diffraction region, a relationship between the light field $U_h$ modulated by the metasurface holographic device and the light field $U_i$ on the image plane can be expressed as:

$$U_i(f_x, f_y) = F(U_h(x,y))$$

where the light field $U_i$ on the image plane is the Fourier transform of the metasurface-modulated light field $U_h$, $f_x = k_x/2\pi$, and $f_y = k_y/2\pi$ are the spatial frequency components of the light field modulated by the metasurface holographic device and also denotes coordinates of the image plane; $k_x$ and $k_y$ denote the components of the free-space wave vector $k_0$ along the two perpendicular directions of x and y axes; as can be seen, the image projected by the holographic device is determined by the spatial frequency distribution of the metasurface-modulated light field $U_h$; the light intensity of the image projected by the metasurface holographic device is consistent to the square of the k-space spatial frequency distribution pattern of the metasurface, that is $I_i = U(f_x, f_y)^2 = |F(U_h(x, y))|^2$. Since the metasurface holographic device applies discontinuous light field modulation through a discrete meta-atom array, the metasurface-modulated light field $U_h$, which has undergone a discrete Fourier transform (DFT), has a continuous and periodic spatial frequency distribution; regarding the metasurface-modulated light field $U_h$ as a two-dimensional discrete sequence, where the meta-atom pitch P denotes the sampling interval, the period of the spatial frequency distribution $U_h$ will be 1/P according to the properties of the discrete Fourier transform, and the central period ranges from $-\frac{1}{2}P$ to $\frac{1}{2}P$; considering a normalized spatial frequency coordinate system with two perpendicular coordinate axes of $k_x/k_0$ and $k_y/k_0$, the central-period spatial frequency region ranges from $-\lambda_0/2P$ to $\lambda_0/2P$, where $\lambda_0$ is the wavelength of the incident light in the vacuum; when P is less than half of the wavelength $\lambda_0$ (P<$\lambda_0/2$), the maximum values of the two perpendicular axes $k_x/k_0$ and $k_y/k_0$ exceed 1, and the central period now contains two parts: the propagation-wave region where the encoded images can propagate in free space; the evanescent-wave region where the encoded images are in the form of evanescent wave and thus cannot propagate in free space; the boundary of the two regions can be expressed as $(k_x/k_0)^2 + (k_y/k_0)^2 = 1$.

For oblique incidence, the incident light imparts an additional in-plane phase gradient $p_g = n \sin(\alpha)k_0$ on the metasurface-modulated light field $U_h$. The in-plane phase gradient $p_g$ is determined by the incident angle $\alpha$ and the surrounding refractive index n. According to the properties of the Fourier transform, $$U_i\left(\frac{1}{\lambda_0}\left(\frac{k_x}{k_0} - \frac{p_g}{k_0}\cos(\theta_x)\right), \frac{1}{\lambda_0}\left(\frac{k_y}{k_0} - \frac{p_g}{k_0}\cos(\theta_y)\right)\right) =$$
$$F(U_h(x, y)\exp(ip_g(x\cos(\theta_x) + y\cos(\theta_y))))$$

the spatial frequency distribution pattern (encoded target images) will translate in the k-space when the metasurface-modulated light field $U_h$ is imparted an additional in-plane phase gradient $p_g$. In the coordinate system of normalized k-space with axes of $k_x/k_0$ and $k_y/k_0$, the translation distance $d_t = p_g/k_0$, and the components of the translation distance $d_t$ along the directions of $k_x/k_0$ and $k_y/k_0$ are $p_g \cos(\theta_x)/k_0$ and $p_g \cos(\theta_y)/k_0$, respectively; $\theta_x$ and $\theta_y$ denote the angles between the direction of the in-plane phase gradient and the two main axes x and y of the coordinate system on the holographic device's plane; when the device is applied a proper phase gradient that results in a translation distance $d_t > 1$, the target image in the evanescent-wave region can be translated to the propagation-wave region for free-space holographic projection. Therefore, multiple target images are encoded in the evanescent-wave region of k-space, and a phase gradient is applied on the metasurface-modulated light field through an oblique incident light, such that the selected target image can be translated to the propagation-wave region. The sizes and positions of the multiple target images are carefully designed, and when the device is under the illumination of an oblique incident light with different azimuthal angles, different target image can be translated to the center of the propagation-wave region each time to realize holographic projection along the normal direction of the device, that is, angle multiplexing. In the design of the device, polarization multiplexing is enabled by using polarization-multiplexed phase modulation methods. For example, circular-polarization-multiplexed image switch can be realized by using geometric phase modulation method; linear-polarization-multiplexed image switch can be realized by using propagation phase modulation method.

Embodiment 1 will be described below. A six-channel metasurface holographic device multiplexed by the azimuthal angle and circular polarization state of total internal reflection incident light is provided. FIG. 1 shows the schematic diagram of a planar-waveguide-based six-channel metasurface holographic device in Embodiment 1 according to the present disclosure. The holographic device includes a glass planar waveguide 1 and a metasurface 2 above the glass planar waveguide. Incident light propagates inside the waveguide in the form of total internal reflection, and illuminates on the metasurface located on the surface of the waveguide. The holographic device is capable of selectively projecting multiple crosstalk-free holographic images according to different circular polarization state and the azimuthal angle of the total internal reflection light. The device is designed based geometric phase modulation method and has broadband operational property. Taking a six-channel metasurface holographic device as an example, when the total internal reflection incident light has different azimuthal angles (0°, 60°, 120°) and circular polarization states (left-handed circular polarization and right-handed circular polarization), the device can selectively project six crosstalk-free independent images. Due to the broadband operational property, the projected target images can have different colors. The glass planar waveguide 1 is the substrate of the metasurface 2.

The metasurface in Embodiment 1 consists of periodically arranged anisotropic meta-atoms (sub-wavelength structural units). The meta-atoms at different spatial positions have the same size but different rotation angles. Designed based on the geometric phase modulation method, this metasurface works under the condition of circularly-polarized light illumination. The phase modulation shift $\Delta\varphi$ applied by each meta-atom is twice the spatial rotation angle $\theta$, that is $\Delta\varphi = \pm 2\theta$, which is imparted onto the transmitted light of orthogonal polarization state. The sign of the phase modulation shift $\Delta\varphi$ is determined by the handedness of the incident circularly-polarized light.

Figure 2:
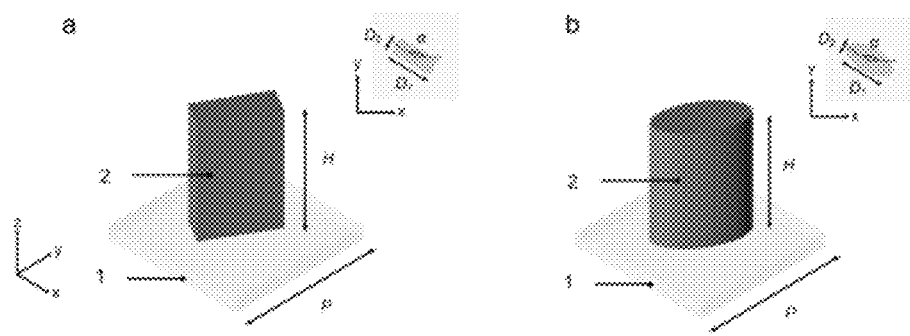
FIG. 2 shows the schematic diagrams of two commonly used anisotropic meta-atoms. In the figures, 1. refers to glass substrate; 2. refers to pillar structure made of dielectric material.

FIG. 2 shows two commonly used anisotropic meta-atoms composed of a pillar structure 1 and a square glass substrate 2. The pillar structure can be a rectangular pillar or an elliptic pillar made of materials that are transparent or have low absorption in the visible spectrum. P is the meta-atom pitch, $\theta$ is the rotation angle of the pillar in the meta-atoms, $D_1$ and $D_2$ are the long-side (axis) and short-side (axis) lengths of the cross section of the pillar structure, respectively, and H is the height of the pillar structure. For the visible spectrum (700 nm>$\lambda_0$>400 nm), the pillar structure can be made of dielectric materials with a high refractive index (refractive index>1.5) and a low loss (absorption coefficient<0.5). Preferred materials include silicon (Si), titanium dioxide ($TiO_2$), hafnium oxide ($HfO_2$), silicon nitride ($SiN_x$), tantalum pentoxide ($Ta_2O_5$), niobium pentoxide ($Nb_2O_5$), gallium nitride (GaN), silicon oxide ($SiO_2$) and polymer materials, as well as combinations of the above materials. The glass substrate can be made of fused quartz or other transparent glass materials.

Figure 3:
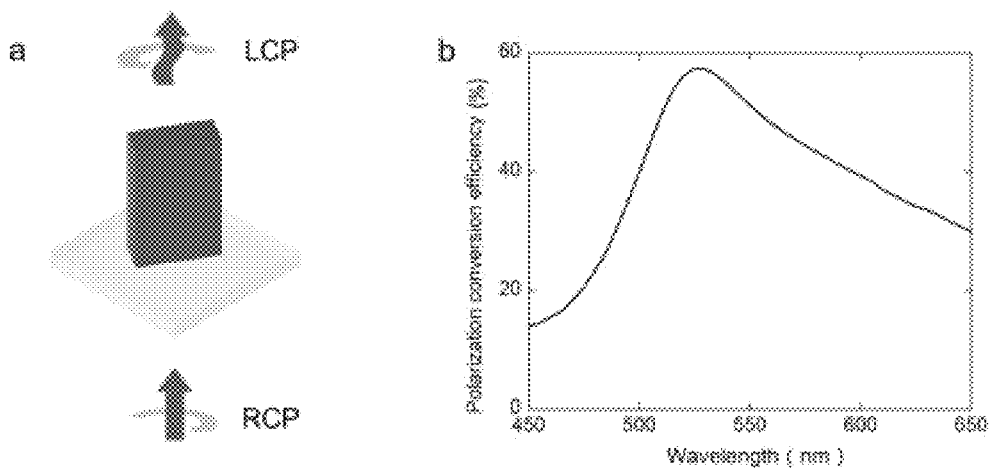
FIG. 3 shows the schematic diagram of circular polarization conversion and conversion efficiency curve of the meta-atoms in Embodiment 1 according to the present disclosure.

Optionally, for the six-channel metasurface holographic device in Embodiment 1 according to the present disclosure, the pitch P of meta-atoms is 177 nm, and the working wavelength $\lambda_0$ is 637 nm. Polycrystalline silicon is used as the constituent material of the pillar structure, and fused quartz glass is used as material of the substrate. Parameters of the pillar structure are: $D_1$ is 120 nm, $D_2$ is 50 nm, and H is 280 nm; The rotation angle $\theta$ varies spatially, which is determined by the target phase $\varphi_t(x,y)$. The target phase $\varphi_t$ can be calculated using holographic phase retrieval algorithms, including angular-spectrum-based Gerchberg-Saxton (GS) algorithm and point source method. Design of the device structure are implemented by periodically arranging the meta-atoms and adjusting the rotation angles of the pillars according to the target phase $\varphi_t(x, y)$. FIG. 3 shows the schematic diagram of circular polarization conversion and conversion efficiency curve of the meta-atoms in Embodiment 1 according to the present disclosure. The left figure is the schematic diagram of circular polarization conversion of the meta-atom. When circularly-polarized incident light with a certain handedness passes through the meta-atom, part of the incident light will be converted to circularly-polarized light with the opposite handedness. Conversion efficiency is defined as the ratio of the intensity of the transmitted converted light to the intensity of incident light. The right figure shows the conversion efficiency curve of the meta-atoms of the six-channel metasurface holographic device across the visible spectrum.

Figure 4:
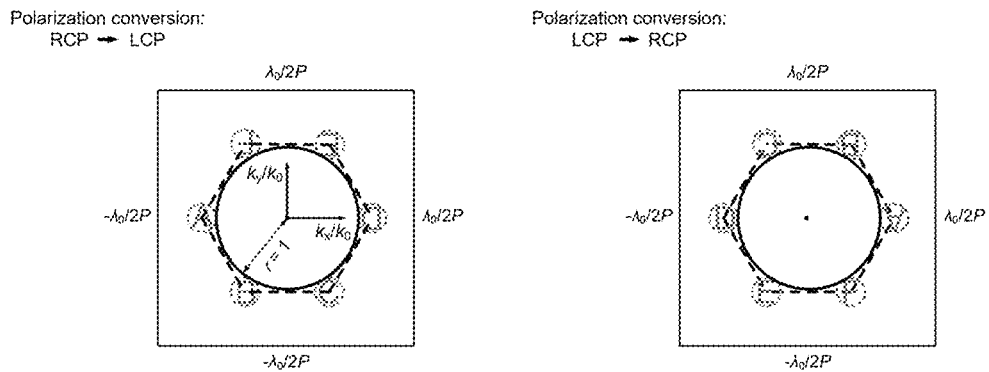
FIG. 4 shows the spatial frequency distribution patterns encoded in the normalized k-space of the six-channel metasurface holographic device in Embodiment 1 (corresponding to normal incidence) according to present disclosure.

For the six-channel holographic device multiplexed by the azimuthal angle and circular polarization in Embodiment 1, the encoded holographic image, which is the spatial frequency distribution of the metasurface-modulated light field in the central period of normalized k-space, is shown in FIG. 4. In FIG. 4, coordinate axes of the normalized k-space are $k_x/k_0$ and $k_y/k_0$, respectively. The range of the normalized k-space central period is from −1.8 to 1.8 along the two coordinate axis directions according to the ratio of the free-space wavelength to the meta-atom pitch. The left figure is the encoded holographic image when the incident light is in the normal propagation direction and right-handed circular polarization, and the right figure is the encoded holographic image when the incident light is in the normal propagation direction and in the left-handed circular polarization. Since the metasurface is designed based on the geometric phase modulation method, for two circularly-polarized incident light with opposite handedness, the metasurface-imparted phase shift modulations are identical in magnitude but opposite in sign. Consequently, their associated spatial frequency distribution patterns in the k-space are central symmetric with respect to each other, as shown in FIG. 4. The normalized k-space in FIG. 4 is divided into two parts by a black solid-line circle: the propagation-wave region inside the black solid-line circle and the evanescent-wave region outside the black solid-line circle. The black solid-line circle denotes the boundary of the propagation-wave region and the evanescent-wave region and can be expressed as $(k_x/k_0)^2+(k_y/k_0)^2=1$. Six target images (capital letters from "A" to "F") are encoded in the evanescent-wave region of the normalized k-space, and each target image is centered on one vertex of a regular hexagon (black dashed lines) with a side length of 1.2 in the normalized k-space coordinate system. Each image is located inside a circular area with a radius of 0.2 (black dotted-line circles). The circular area corresponds to a divergent angle $\theta=2 \arctan(r_i) \approx 22.6°$ for target images when they are selectively moved to the k-space center (origin of k-space coordinate system) for projection in the normal direction. The center of the regular hexagon is at the origin (0, 0) of the normalized k-space coordinate system, such that the center of each target image has a distance d=1.2 away from the origin.

For the spatial frequency distribution patterns in FIG. 4, in order to move the target images from the evanescent-wave region to the center of the normalized k-space for holographic projection along the normal direction of the device, the target images need to be translated with a distance of 1.2 in the normalized k-space, and the incident light needs to provide an in-plane phase gradient of $2.4\pi/\lambda$. The maximum phase gradient that can be provided by an oblique incident light in free space is $2\pi/\lambda$, which cannot meet the above conditions. However, the upper limit of the phase gradient of incident light can be further improved by increasing the refractive index of the environmental surrounding medium. To provide the required phase gradient, fused quartz glass or other high-refractive-index transparent materials such as silicon nitride ($SiN_x$) or titanium dioxide ($TiO_2$) can be used as waveguide to convey incident light. Optionally, fused quartz glass, which has a refractive index $n_g$ of about 1.46 at the design wavelength $\lambda_0$=637 nm, is chosen as the waveguide material for the metasurface holographic device. Therefore, it can be calculated that the total internal reflection angle $\alpha$ of incident light inside the waveguide is approximately $\arccos(d/n_g) \approx 55.3°$, so as to provide the required in-plane phase gradient of $2.4\pi/\lambda$. The azimuthal angle $\beta$ of the total internal reflection incident light determines the translation direction of the target images in the k-space. Therefore, different target images can be selectively translated to the center of the propagation-wave region by varying the azimuthal angle and polarization state of the incident light.

Figure 5:
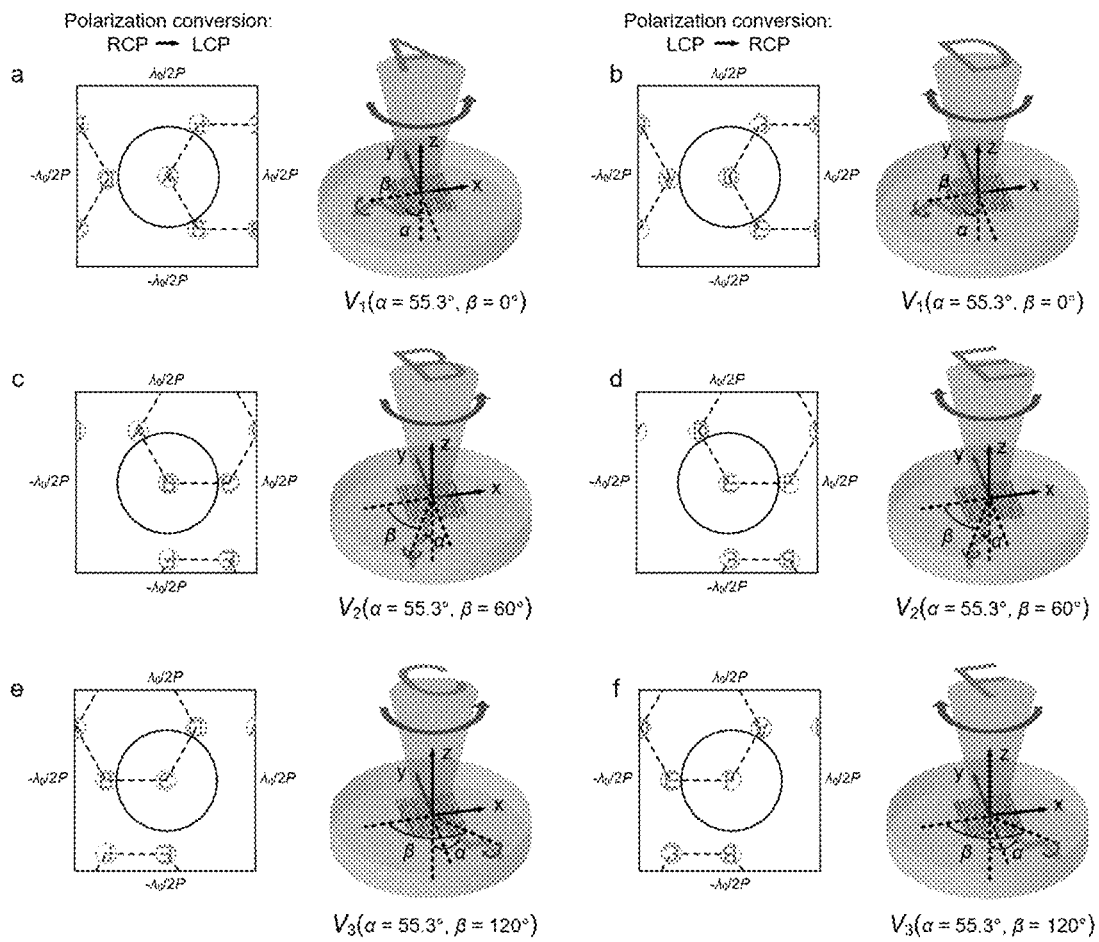
FIG. 5 shows the spatial frequency distribution patterns in the normalized k-space and the corresponding schematic diagrams of image projection when the six-channel metasurface holographic device in Embodiment 1 is under the illumination of total internal reflection light having different circular polarization states and azimuthal angles according to the present disclosure.

FIG. 5 shows the spatial frequency distribution patterns in the normalized k-space and the corresponding schematic diagrams of image projection when the six-channel metasurface holographic device in Embodiment 1 is under the illumination of total internal reflection light having different circular polarization states and azimuthal angles according to the present disclosure. $\alpha$ and $\beta$ represent the total internal reflection angle and the azimuthal angle of the incident light inside the waveguide, respectively. When the total internal reflection light illuminating onto the metasurface inside the waveguide is in the right-handed circular polarization state and along the directions of $V_1(\alpha=55.3°, \beta=0°)$, $V_2(\alpha=55.3°, \beta=60°)$ and $V_3(\alpha=55.3°, \beta=120°)$, respectively, three target images, capital letters "A", "B" and "C", can be selectively moved to the center of the normalized k-space, respectively. Accordingly, the holographic device will project the corresponding letters into the free space along the normal direction of the device plane; When the total internal reflection light illuminating onto the metasurface inside the waveguide is in the left-handed circular polarization state and along the directions of $V_1(\alpha=55.3°, \beta=0°)$, $V_2(\alpha=55.3°, \beta=60°)$ and $V_3(\alpha=55.3°, \beta=120°)$, respectively, three target images, capital letters "D", "E" and "F", can be selectively moved to the center of the k-space, respectively. Accordingly, the holographic device will project the corresponding letters into the free space along the normal direction of the device.

When each target image is moved to the center of k-space, other five images remain in the evanescent-wave region, and cannot be projected into the free space, therefore crosstalk between different images can be avoided. It is worth noting that since the spatial frequency distribution in the k-space is periodic, when the encoded images in the non-selected channels are moved outside the boundary of the central period, the same images in adjacent periods will appear from the other side.

Figure 6:
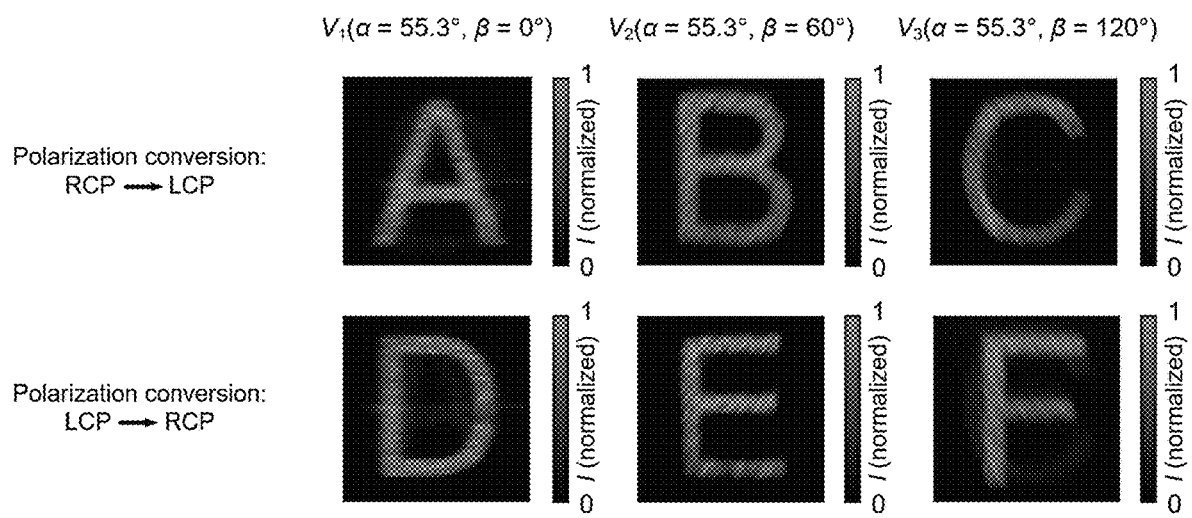
FIG. 6 shows experimental results of the projected images of the six-channel metasurface holographic device in Embodiment 1 according to the present disclosure.

In the experiment, a six-channel metahologram comprising 1500×1500 meta-atoms and occupying a square area with a side length of 264 µm is fabricated on a 500-µm-thick fused quartz substrate. The sample is mounted on the center of a 5-mm-thick polished planar glass slab having a regular-hexagon shape. FIG. 6 shows experimental results of the projected images of the six-channel metasurface holographic device in Embodiment 1 according to the present disclosure. When the total internal reflection light illuminating onto the metasurface inside the waveguide has different circular polarization states and propagates along the directions of $V_1(\alpha=55.3°, \beta=0°)$, $V_2(\alpha=55.3°, \beta=60°)$ and $V_3(\alpha=55.3°, \beta=120°)$, the metasurface holographic device can project six independent crosstalk-free holographic images. The measured divergent angle of the projected holographic image in the experiment is approximately 25°, which is close to the calculated result of 22.6°.

Figure 7:
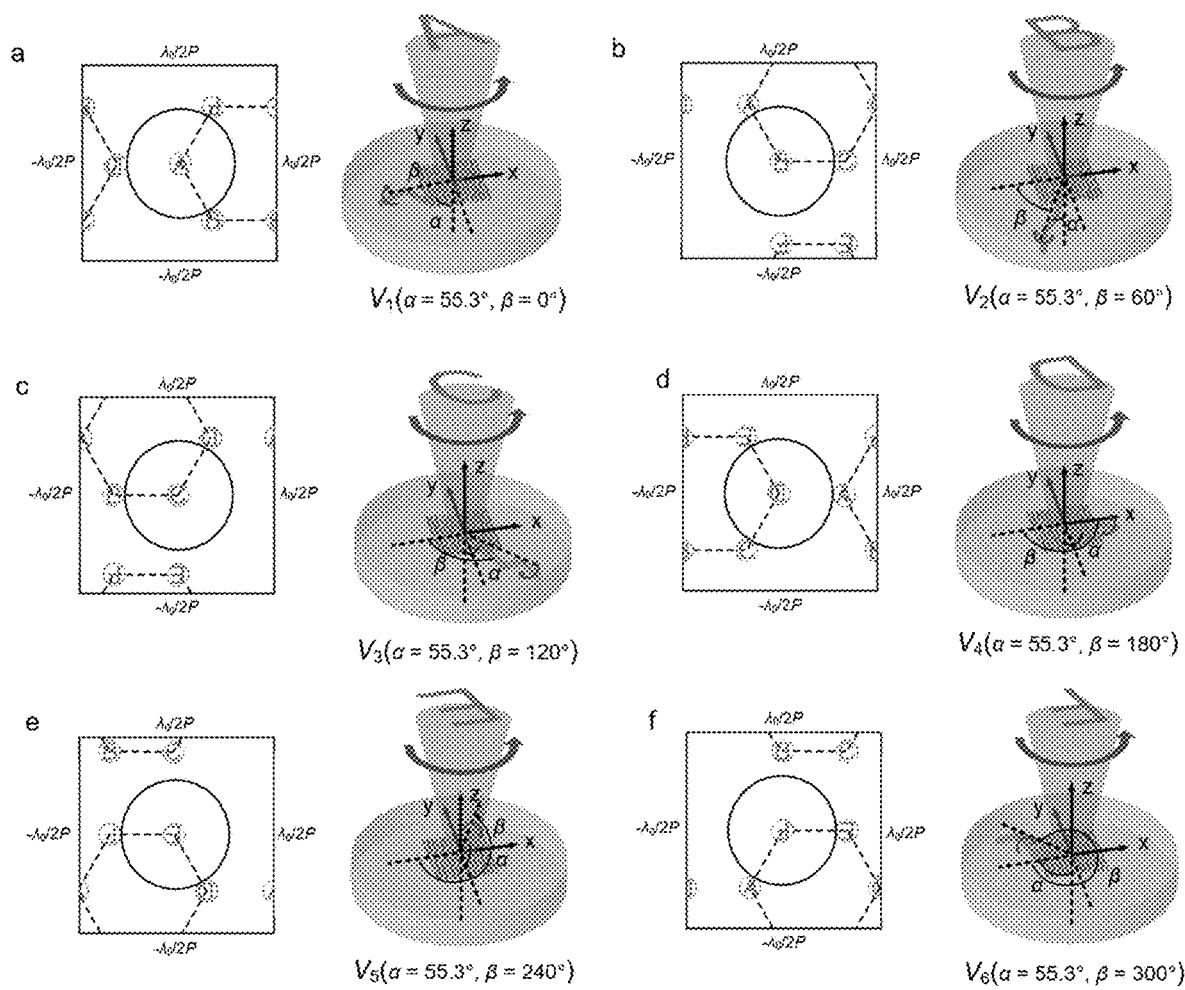
FIG. 7 shows the spatial frequency distribution patterns in the normalized k-space and the corresponding schematic diagrams of image projection when the six-channel metasurface holographic device in Embodiment 1 is under the illumination of circularly-polarized total internal reflection light having different azimuthal angles according to the present disclosure.

Optionally, the projected images of the holographic device in this embodiment can also be switched by only changing the azimuthal angle of the incident light. As shown in FIG. 7, when the total internal reflection light of a certain circular polarization state (taking right-handed circular polarization as an example) illuminates the metasurface along the directions of $V_1(\alpha=55.3°, \beta=0°)$, $V_2(\alpha=55.3°, \beta=60°)$, $V_3(\alpha=55.3°, \beta=120°)$, $V_4(\alpha=55.3°, \beta=180°)$, $V_5(\alpha=55.3°, \beta=240°)$, and $V_6(\alpha=55.3°, \beta=300°)$, different target images are translated to the center of the normalized k-space and projected along the normal direction of the device; the other five images remain in the evanescent-wave region, therefore they cannot be projected into free space, such that crosstalk between different images can be avoided.

Figure 8:
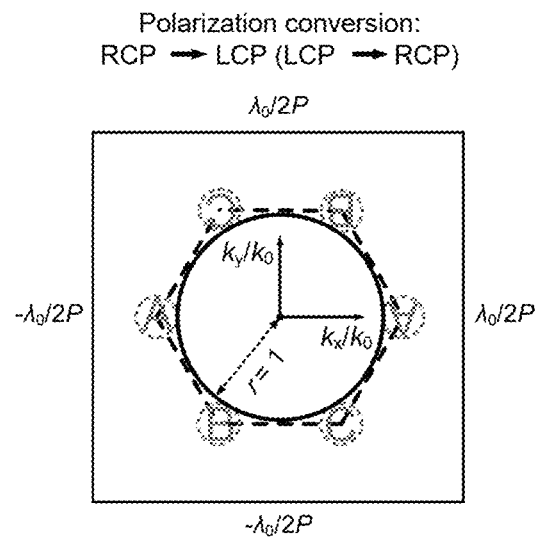
FIG. 8 shows the spatial frequency distribution pattern encoded in the normalized k-space of the three-channel polarization-independent metasurface holographic device in Embodiment 2 (corresponding to normal incidence) according to the present disclosure.

By adjusting the target images encoded in the normalized k-space, the present disclosure can implement multi-channel polarization-independent holographic display multiplexed by the azimuthal angle of total internal reflection light. Embodiment 2 is the azimuthal-angle-multiplexed three-channel polarization-independent metasurface holographic display device. FIG. 8 shows the spatial frequency distribution pattern encoded in the normalized k-space of the three-channel polarization-independent metasurface holographic device in Embodiment 2 (corresponding to normal incidence) according to the present disclosure. Coordinate axes of the normalized k-space are $k_x/k_0$ and $k_y/k_0$, respectively, with ranges from −1.8 to 1.8. The normalized k-space in the figure is divided into two parts by a black solid-line circle: the propagation-wave region inside the black solid-line circle and the evanescent-wave region outside the black solid-line circle. The black solid-line circle denotes the boundary of the propagation-wave region and the evanescent-wave region and can be expressed as $(k_x/k_0)^2+(k_y/k_0)^2=1$. Six target images are encoded in the evanescent-wave region of the normalized k-space, and each target image is located within a circular area with a radius of 0.2. Each target image is centered on one vertex of a regular hexagon (black dashed lines) with a side length of 1.2 in the normalized k-space coordinate system. The center of the regular hexagon is at the origin (0, 0) of the normalized k-space coordinate system, such that the center of each target image has a distance d=1.2 away from the origin. Three pairs of images, capital letters "A", "B", and "C", at the two opposing vertices are central symmetric about the origin of the k-space. Therefore, for such holographic device design, the distribution of the images encoded in the k-space under normal incidence is central symmetric, and when the incident light undergoes polarization conversion from right-handed circular polarization to left-handed circular polarization, or vice versa, the images encoded in the k-space will remain the same.

Any polarization state can be considered as a combination of two opposite circular polarization states, therefore, for a total internal reflection light of any polarization state, as long as it illuminates onto the metasurface along the direction of $V_1(\alpha=55.3°, \beta=0°)$, $V_2(\alpha=55.3°, \beta=60°)$, and $V_3(\alpha=55.3°, \beta=120°)$, the encoded three target images, capital letters "A", "B", and "C" will be moved to the center of the k-space to be projected along the normal direction of the device, respectively. The projected target image can be considered as the superposition of two identical images corresponding to two opposite polarization conversions, and it will not change along with the variation of the polarization state of the total internal reflection incident light, such that the metasurface holographic device can implement three-channel polarization-independent holographic projection, and the projected image is only determined by the azimuthal angle of the total internal reflection light in the waveguide.

Figure 9:
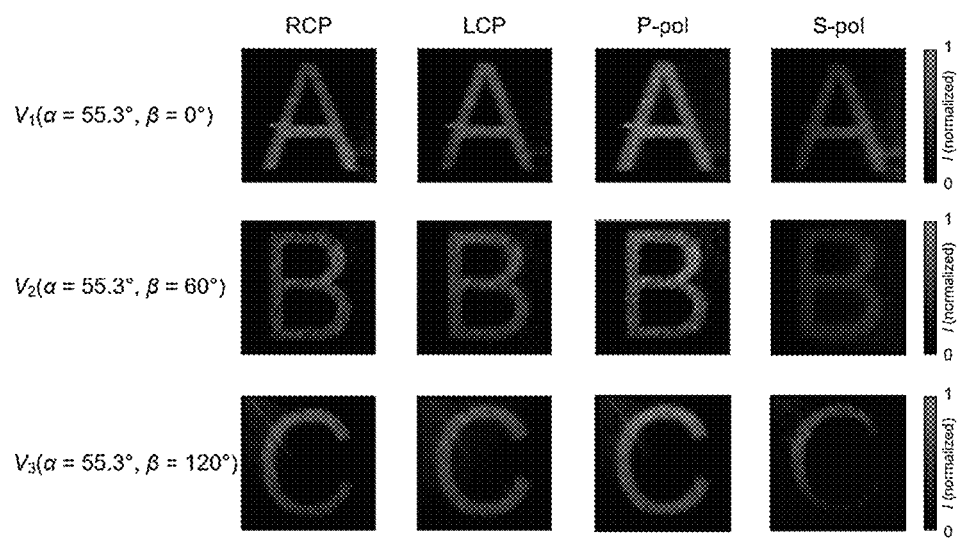
FIG. 9 shows the experimental results of the projected images of the three-channel polarization-independent metasurface holographic device in Embodiment 2 according to the present disclosure.

FIG. 9 shows the experimental results of the projected images of the three-channel polarization-independent metasurface holographic device in Embodiment 2 according to the present disclosure. In the experiment, a sample containing 1500×1500 meta-atoms and occupying a square area with a side length of 264 m is fabricated. To demonstrate the device's polarization independent character, the incident light is successively set to have four typical states of polarization, namely, right-handed circular polarization (RCP), left-handed circular polarization (LCP), P-polarization (electric field vector parallel to the plane of incidence), and S-polarization (electric field vector perpendicular to the plane of incidence) and illuminates the metasurface from the directions of $V_1(\alpha=55.3°, \beta=00)$, $V_2(\alpha=55.3°, \beta=60°)$ and $V_3(\alpha=55.3°, \beta=120°)$, respectively. Experimental results show a consistent preservation of projected images across varying polarization states of the incident light, and the image can only be switched through manipulating the azimuthal angle of incident light.

In the present disclosure, devices are designed based on the geometric phase modulation method, which has broadband operational property. The geometric phase shift modulation is independent of the operational wavelength. Preferably, by adjusting the target images encoded in the normalized k-space and illuminating the metasurface using light of three basic colors (red, green, and blue), the present disclosure can implement multi-channel polarization-multiplexed full-color holographic display. Embodiment 3 is a two-channel holographic display device multiplexed by circular polarization state. In Embodiment 3, red, green and blue color components of the two colored images are encoded into the two distinct sets of angle-multiplexed channels of the six-channel holographic device, such that a dual-channel polarization-multiplexed full-color holographic display can be implemented.

Figure 10:
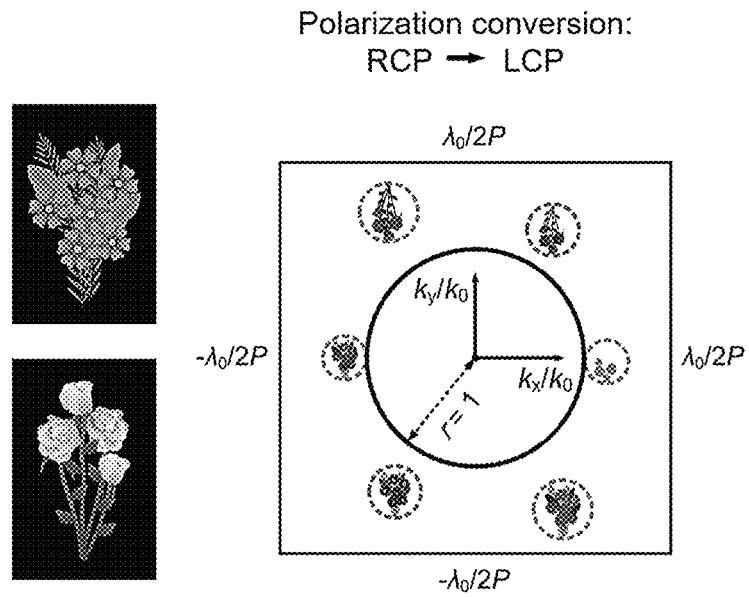
FIG. 10 shows the spatial frequency distribution pattern encoded in the normalized k-space of the dual-channel full-color holographic device in Embodiment 3 (corresponding to normal incidence) according to present disclosure.

FIG. 10 shows the spatial frequency distribution pattern encoded in the normalized k-space of the dual-channel full-color holographic device in Embodiment 3 (corresponding to normal incidence) according to present disclosure. Coordinate axes of the normalized k-space are $k_x/k_0$ and $k_y/k_0$, respectively, with ranges from −1.8 to 1.8 under the condition of red light illumination ($\lambda_0$=637 nm). The normalized k-space in the figure is divided into two parts by a black solid-line circle: the propagation-wave region inside the black solid-line circle and the evanescent-wave region outside the black solid-line circle. The black solid-line circle denotes the boundary of the propagation-wave region and the evanescent-wave region and can be expressed as $(k_x/k_0)^2+(k_y/k_0)^2=1$. Six target images, representing the red, green and blue color components of the two colored images (taking two colored images of lilacs and roses as examples) are encoded into the evanescent-wave region of the normalized k-space. The red, green, and blue components are encoded into the two distinct sets of angle-multiplexed channels. The encoded images of different color components are centered onto the vertices of a hexagon. Due to the inherent dispersive nature of the geometric phase modulation, the dimension of a projected image is proportional to the wavelength of illumination. To mitigate such effect, sizes of the images of different color components and distances from each image center to the k-space center are adjusted to be inversely proportional to the wavelength of the corresponding color. Wavelengths of the red, green and blue color light used in the present disclosure are 637 nm, 532 nm and 473 nm, respectively. Therefore, the target images representing the red color component are located in the circular areas with a radius of 0.2, and is 1.2 from the center of k-space; the target images representing the green color component are located in the circular areas with a radius of 0.24, and is 1.44 from the center of k-space; the target images representing the blue color component are located in the circular areas with a radius of 0.27, and is 1.62 from the center of k-space. The center of the hexagon is at the origin (0, 0) of the normalized k-space coordinate system. When the three circularly-polarized total internal reflection incident lights of red, green, and blue color simultaneously illuminate onto the metasurface from the direction of $V_1$ to $V_3$, respectively, the components of different colors can be projected normally into free space and overlapped to form the encoded colored image. The switch of the two encoded colored images can be implemented by changing the circular polarization state of the total internal reflection incident light of three different colors.

Figure 11:
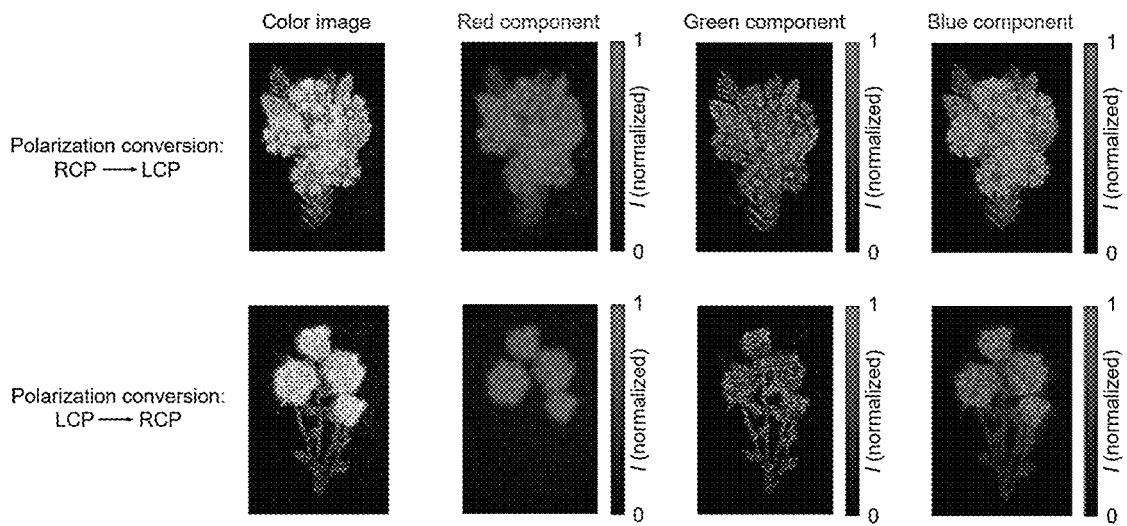
FIG. 11 shows the experimental results of the two projected colored images and the six single-color components of the dual-channel full-color holographic device in Embodiment 3 according to the present disclosure.
Figure 12:
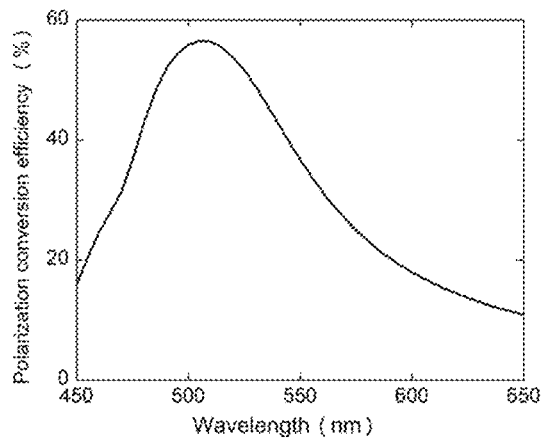
FIG. 12 shows the circular polarization conversion efficiency curve of the meta-atoms of the eight-channel metasurface holographic device in Embodiment 4 according to the present disclosure.

FIG. 11 shows the experimental results of the two projected colored images and the six single-color components of the dual-channel full-color holographic device in Embodiment 3 according to the present disclosure. In the experiment, a metasurface sample having 3000×3000 meta-atoms and occupying a square area with a side length of 528 μm on a 500-μm-thick fused quartz substrate is fabricated. Red, green and blue lasers, propagating along the three azimuthal directions of $V_1$($\alpha$=55.3°, $\beta$=00), $V_2$($\alpha$=55.3°, $\beta$=60°) and $V_3$($\alpha$=55.3°, $\beta$=120°), respectively, illuminates on to the metasurface simultaneously. As expected, the metahologram yields two distinct, crosstalk-free, and spin-multiplexed colored images, when the states of polarization of three illumination beams are properly configured as right-handed circular polarization or left-handed circular polarization By further expanding the k-space's central-period range to properly accommodate more target images, metasurface holographic display devices hosting more crosstalk-free projection channels can be realized. Preferably, based on the same design strategy, Embodiment 4 of the present disclosure provides a planar-waveguide-based eight-channel metasurface holographic device. The meta-atom pitch of the device is set to be 155 nm, approximately 1/4.1 of the free-space working wavelength ($\lambda_0$=637 nm). Therefore, the central period of the k-space ranges from −2.05 to 2.05 under the normalized coordinate system with axes of $k_x/k_0$ and $k_y/k_0$. Structural parameters of the rectangular polycrystalline silicon pillar in the meta-atoms are 110 nm ($D_1$)×40 nm ($D_2$), with a height (H) of 280 nm. FIG. 12 shows the circular polarization conversion efficiency curve of meta-atoms in the eight-channel metasurface holographic device in a visible light band in Embodiment 4 according to the present disclosure.

Figure 13:
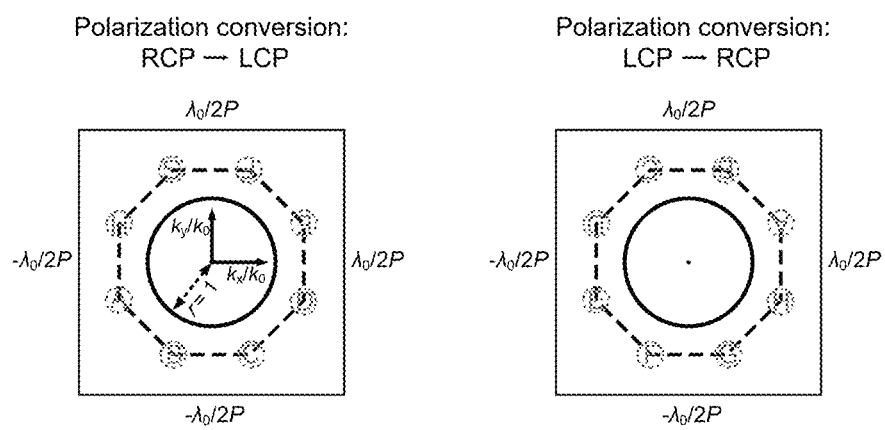
FIG. 13 shows the spatial frequency distribution patterns encoded in the normalized k-space of the eight-channel metasurface holographic device in Embodiment 4 (corresponding to normal incidence) according to the present disclosure.

FIG. 13 shows the spatial frequency distribution patterns encoded in the normalized k-space of the eight-channel metasurface holographic device in Embodiment 4 (corresponding to normal incidence) according to the present disclosure. Coordinate axes of the normalized k-space are $k_x/k_0$ and $k_y/k_0$, respectively, with ranges from −2.05 to 2.05. The left figure is the encoded holographic image when the incident light is in the normal direction and has the right-handed circular polarization, and the right figure is the encoded holographic image when the incident light is in the normal direction and has the left-handed circular polarization. The left and the right figures are central symmetric with respect to each other. The normalized k-space in the figure is divided into two parts by a black solid-line circle: the propagation-wave region inside the black solid-line circle and the evanescent-wave region outside the black solid-line circle. The black solid-line circle denotes the boundary of the propagation-wave region and the evanescent-wave region and can be expressed as $(k_x/k_0)^2+(k_y/k_0)^2=1$. Eight target images (capital letters from "A" to "H") are encoded in the evanescent-wave region of the normalized k-space, and each target image is located within a circular area with a radius of 0.2. Eight target images are centered onto the vertices of a regular octagon with a side length of 1.2. The center of the regular octagon is at the origin (0, 0) of the normalized k-space coordinate system, such that the center of each target image has a distance d=1.57 away from the origin.

For oblique incidence, in order to move the target images from the evanescent-wave region to the center of the k-space for holographic projection along the normal direction of the device, the translation distance $d_t$ in the normalized k-space equals 1.57, which corresponds to an in-plane phase gradient of 3.14π/λ. The value exceeds the maximum in-plane phase gradient (2.92π/λ) that can be provided by a total internal reflection light propagating inside a normal glass planar waveguide ($n_g$≈1.46), therefore, waveguide materials with higher refractive index (n>1.57) are needed. Optionally, Schott N-LASF46 glass is selected and used as the waveguide material of the substrate, which exhibits a refractive index of 1.9 at the working wavelength of 637 nm. In order to provide the desired phase gradient, the total internal reflection angle α of the incident light inside the waveguide is α=arcsin($p_g/k_0n_g$) 56.3°. When the azimuthal angle β of the circularly-polarized total internal reflection incident light is 22.5°, 67.5°, 112.5° and 157.5°, respectively, the two groups of capital letters "A", "B", "C", "D", or "E", "F", "G", "H" can be translated to the center of the k-space, respectively, depending on the circular polarization conversion direction (from the right-handed circular polarization to the left-handed circular polarization, or vice versa).

Figure 14:
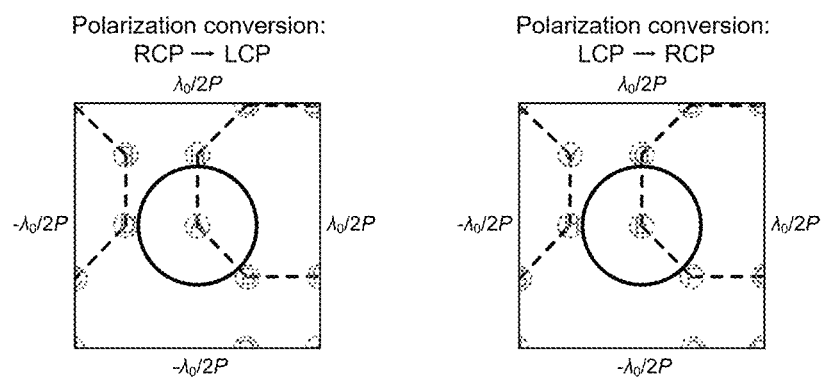
FIG. 14 shows the spatial frequency distribution patterns encoded in the normalized k-space of the eight-channel metasurface holographic device under the illumination of circularly polarized total internal reflection light propagating in the direction of $V_1$ ($\alpha=56.3°$, $\beta=22.5°$) in Embodiment 4 according to present disclosure.

Taking β equals 22.5° as an example, FIG. 14 shows the spatial frequency distribution patterns encoded in the normalized k-space of the eight-channel metasurface holographic device under the illumination of circularly polarized total internal reflection light propagating in the direction of $V_1$($\alpha$=56.3°, $\beta$=22.5°) in Embodiment 4 according to present disclosure. The left figure is the encoded holographic image for normal incident light having the right-handed circular polarization, and the right figure is the encoded holographic image for normal incident light having the left-handed circular polarization. Depending on the circular polarization state of the incident light, target images, letter "A" or "E", can be translated to the center of the normalized k-space, respectively, and the other images remain in the evanescent-wave region, such that crosstalk between different images can be avoided. Therefore, the device can implement eight-channel crosstalk-free holographic projection.

Figure 15:
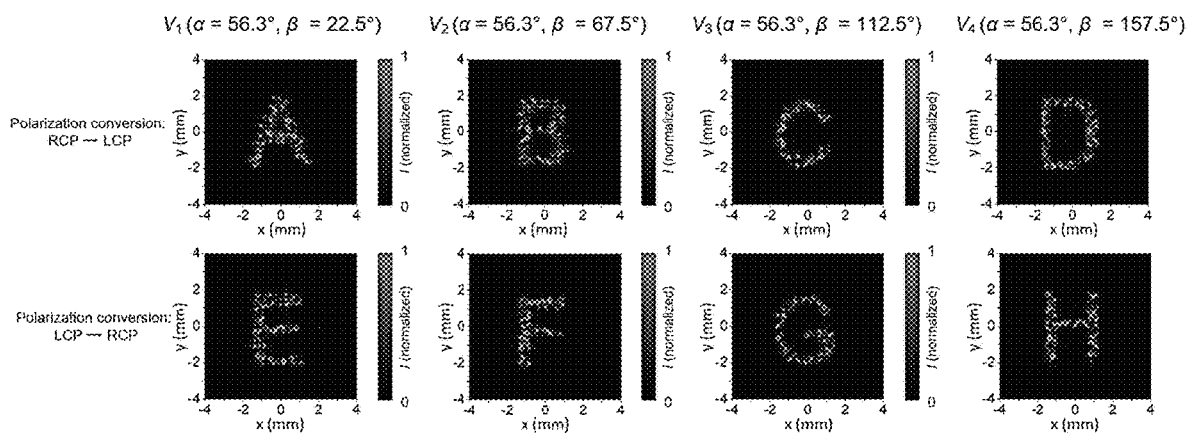
FIG. 15 shows simulated imaging results of the eight-channel metasurface holographic device in Embodiment 4 according to the present disclosure.

FIG. 15 shows the simulated imaging results of the eight-channel metasurface holographic device in Embodiment 4 according to the present disclosure. The device in the simulation contains 200×200 meta-atoms and occupies a square area with a side length of 30.6 m. When the total internal reflection light of the right-handed or left-handed circular polarizations illuminates the metasurface along the directions of $V_1(\alpha=56.3°, \beta=22.5°)$, $V_2(\alpha=56.3°, \beta=67.5°)$, $V_3(\alpha=56.3°, \beta=112.5°)$ and $V_4(\alpha=56.3°, \beta=157.5°)$, the metasurface holographic device can project eight independent crosstalk-free holographic images.

Similar to Embodiment 1, the eight independent images in Embodiment 4 can be multiplexed by four azimuthal angles ($\beta=22.5°, 67.5°, 112.5°, 157.5°$) and two circular polarization states (right-handed circular polarization, and left-handed circular polarization) of total internal reflection light, or it can be multiplexed only by the azimuthal angle ($\beta=22.5°, 67.5°, 112.5°, 157.5°, 202.5°, 247.5°, 292.5°, 337.5°$).

For the device in the present disclosure, the number of channels can be further increased by using other multiplexing approaches, such as linear polarization multiplexing and orbital angular momentum multiplexing. The wavelength, meta-atom pitch, structural parameters of the pillars, structural materials, and substrate material mentioned in the present disclosure can be adjusted according to design requirements.

The above embodiments are merely used to illustrate the present disclosure, but are not intended to limit the present disclosure. Although related embodiments and drawings of the present disclosure have been disclosed for illustrative purposes, it should be understood by those skilled in the art that various substitutions, changes, and modifications can be made without departing from the spirit and scope of the present disclosure and the appended claims. Therefore, all equivalent technical solutions fall within the scope of the present disclosure, and the scope of patent protection of the present disclosure should be defined by the claims, and should not be limited to the contents disclosed in the preferred embodiments and drawings.

The invention claimed is:

1. A holographic device, comprising a glass planar waveguide and a metasurface above the glass planar waveguide; light propagates inside the planar waveguide in the form of total internal reflection and illuminates the metasurface; the metasurface is capable of selectively projecting multiple crosstalk-free and independent holographic images according to different combinations of circular polarization state and azimuth angle of the total internal reflection incident light inside the waveguide; with total internal reflection light illumination, the metasurface-modulated light field of the holographic device is imparted an additional in-plane phase gradient to translate encoded target images between the propagation-wave region and the evanescent-wave region of k-space (spatial frequency space), therefore each target image can be selectively displayed free from crosstalk.

2. The holographic device according to claim 1, wherein the device can also implement the switch of all images by only changing the azimuthal angle of the total internal reflection incident light in the waveguide.

3. The holographic device according to claim 1, wherein by adjusting the images encoded in different channels, a multi-channel polarization-independent holographic device only multiplexed by the incident azimuthal angle can also be implemented.

4. The holographic device according to claim 1, wherein by adjusting the images encoded in different channels, a multi-channel full-color holographic device only multiplexed by the state of polarization can also be implemented.

5. The holographic device according to claim 1, wherein in the design of the device, the k-space range of the metasurface can be enlarged by reducing the pitch P of meta-atom, and when the pitch P of meta-atoms is less than half of the free-space working wavelength ($P<\lambda_0/2$), central-period of k-space contains two regions: propagation-wave region and the evanescent-wave region.

6. The holographic device according to claim 1, wherein for normal incidence, multiple target images are encoded in the evanescent-wave region of the k-space of the metasurface-modulated light field, and according to the basic properties of Fourier transform, the encoded images will be translated in the k-space when the device is illuminated by a total internal reflection incident light; different target images can be selectively translated to the center of k-space according to the polarization state and the azimuthal angle of the total internal reflection incident light, such that the images can be projected along the normal direction of the device; by adjusting the size and positions of the multiple target images encoded in the k-space, it is ensured that only the selected target image can be translated to the center of the k-space each time when the device is illuminated by a total internal reflection incident light having different azimuthal angles and circular polarization states, while the other images remain in the evanescent-wave region, such that crosstalk between different display channels can be avoided, and a multi-channel crosstalk-free holographic display device is realized.

7. The holographic device according to claim 1, wherein the multi-channel metasurface holographic device works in Fraunhofer diffraction region, where the imaging distance is much greater than the size of the holographic device, satisfying the condition of $\max(k_0((x^2+y^2)/2z))<<\pi$, where $k_0$ denotes the free-space wave vector of the incident light, x and y are in-plane coordinates of the holographic device in two perpendicular directions, and z denotes the distance between the image plane and the holographic device; for the multi-channel metasurface holographic device working in the Fraunhofer diffraction region, a relationship between the light field $U_h$ modulated by the metasurface holographic device and the light field $U_i$ on the image plane can be expressed as:

$$U_i(f_x, f_y) = F(U_h(x,y))$$

where the light field $U_i$ on the image plane is the Fourier transform of the metasurface-modulated light field $U_h$, $f_x=k_x/2\pi$, and $f_y=k_y/2\pi$ are the spatial frequency components of the light field modulated by the metasurface holographic device and also denotes coordinates of the image plane; $k_x$ and $k_y$ denote the components of the free-space wave vector $k_0$ along the two perpendicular directions of x and y axes; as can be seen, the image projected by the holographic device is determined by the spatial frequency distribution of the metasurface-modulated light field $U_h$; the light intensity of the image projected by the metasurface holographic device is consistent to the square of the k-space spatial frequency distribution pattern of the metasurface, that is $I_i=|U_i(f_x, f_y)|^2=|F(U_h(x, y))|^2$.

8. The holographic device according to claim 1, wherein since the metasurface holographic device applies discontinuous light field modulation through a discrete meta-atom array, the metasurface-modulated light field $U_h$, which has undergone a discrete Fourier transform (DFT), has a continuous and periodic spatial frequency distribution; regarding the metasurface-modulated light field $U_h$ as a two-dimensional discrete sequence, where the meta-atom pitch P denotes the sampling interval, the period of the spatial frequency distribution $U_h$ will be 1/P according to the properties of the discrete Fourier transform, and the central period ranges from $-\frac{1}{2}P$ to $\frac{1}{2}P$; considering a normalized spatial frequency coordinate system with two perpendicular coordinate axes of $k_x/k_0$ and $k_y/k_0$, the central-period spatial frequency region ranges from $-\lambda_0/2P$ to $\lambda_0/2P$, where $\lambda_0$ is the wavelength of the incident light in the vacuum; when P is less than half of the wavelength $\lambda_0$ (P<$\lambda_0$/2), the maximum values of the two perpendicular axes $k_x/k_0$ and $k_y/k_0$ exceed 1, and the central period now contains two parts: the propagation-wave region where the encoded images can propagate in free space; the evanescent-wave region where the encoded images are in the form of evanescent wave and thus cannot propagate in free space; the boundary of the two regions can be expressed as $(k_x/k_0)^2+(k_y/k_0)^2=1$.

9. The holographic device according to claim 1, wherein for oblique incidence, the incident light imparts an additional in-plane phase gradient $p_g=n\sin(\alpha)k_0$ on the metasurface-modulated light field $U_h$; the in-plane phase gradient $p_g$ is determined by the incident angle $\alpha$ and the surrounding refractive index n; according to the properties of the Fourier transform, $$U_i\left(\frac{1}{\lambda_0}\left(\frac{k_x}{k_0}-\frac{p_g}{k_0}\cos(\theta_x)\right), \frac{1}{\lambda_0}\left(\frac{k_y}{k_0}-\frac{p_g}{k_0}\cos(\theta_y)\right)\right)=$$
$$F(U_h(x,y)\exp(ip_g(x\cos(\theta_x)+y\cos(\theta_y))))$$

the spatial frequency distribution pattern (encoded target images) will translate in the k-space when the metasurface-modulated light field $U_h$ is imparted an additional in-plane phase gradient $p_g$; in the coordinate system of normalized k-space with axes of $k_x/k_0$ and $k_y/k_0$, the translation distance $d_t=p_g/k_0$, and the components of the translation distance $d_t$ along the directions of $k_x/k_0$ and $k_y/k_0$ are $p_g\cos(\theta_x)/k_0$ and $p_g\cos(\theta_y)/k_0$, respectively; $\theta_x$ and $\theta_y$ denote the angles between the direction of the in-plane phase gradient and the two main axes x and y of the coordinate system on the holographic device's plane; when the device is applied a proper phase gradient that results in a translation distance $d_t>1$, the target image in the evanescent-wave region can be translated to the propagation-wave region for free-space holographic projection.

* * * * *